US010465033B2

(12) United States Patent
Urban

(10) Patent No.: US 10,465,033 B2
(45) Date of Patent: Nov. 5, 2019

(54) ONE STEP SYNTHESIS OF ULTRAHIGH MOLECULAR WEIGHT BLOCK COPOLYMERS

(71) Applicant: Clemson University, Clemson, SC (US)

(72) Inventor: Marek W. Urban, Clemson, SC (US)

(73) Assignee: Clemson University Research Foundation, Clemson, SC (US)

( * ) Notice: Subject to any disclaimer, the term of this patent is extended or adjusted under 35 U.S.C. 154(b) by 39 days.

(21) Appl. No.: 15/807,712

(22) Filed: Nov. 9, 2017

(65) Prior Publication Data

US 2018/0127533 A1 May 10, 2018

Related U.S. Application Data

(60) Provisional application No. 62/420,221, filed on Nov. 10, 2016.

(51) Int. Cl.
*C08F 293/00* (2006.01)
*C08F 297/02* (2006.01)

(52) U.S. Cl.
CPC ........ *C08F 297/026* (2013.01); *C08F 293/00* (2013.01); *C08F 2500/01* (2013.01)

(58) Field of Classification Search
CPC .................. C08F 2500/01; C08F 293/00
See application file for complete search history.

(56) References Cited

U.S. PATENT DOCUMENTS

| 8,299,139 B1 | 10/2012 | Taranekar et al. |
| 2012/0095168 A1 | 4/2012 | Kornfield et al. |

FOREIGN PATENT DOCUMENTS

JP 4118583 B2 10/2003

OTHER PUBLICATIONS

Georges, M.K; Veregin, R.P.; Kazmaier, P.M.; Hamer, G.K. Narrow molecular weight resins by a free-radical polymerization process. Macromolecules 1993, 26, 2987-2988.
Hawker, C.J.; Bosman, A. W.; Harth, E. New polymer synthesis by nitroxide mediated living radical polymerizations. Chemical Reviews 2001, 101, 3661-3688.
Wang, J.S.; Malyjaszewski, K. Controlled living radical polymerization. Atom transfer radical polymerization in the presence of transition-metal complexes. Journal of the American Chemical Society 1995, 117, 5614-5615.
Matyjaszewski, K.; Xia, J.; Atom transfer radicalpolymerization. Chemical Reviews 2001, 101, 2921-2990.
Chiefari, J.; Chong, Y.; Ercole, F.; Krstina J.; Jeffery, J.; Le, T.P.; Mayadunne, R.T.; Meijs, G.F.; Harth, E.; Moad, C.L.; Moad, G. Living free-radical polymerization by reversible addition-fragmentation chain transfer: the RAFT process. Macromolecules 1998, 31, 5559-5562.

(Continued)

*Primary Examiner* — Mark S Kaucher
(74) *Attorney, Agent, or Firm* — Dority & Manning, P.A.

(57) ABSTRACT

Single-step synthesis processes for production of ultrahigh molecular weight block copolymers are described. The ultrahigh molecular weight copolymers can have a molecular weight of about $10^6$ or greater and can be formed within a few hours in a surfactant-free environment. The formation process is controlled by initiator-starvation conditions in a sequential polymerization of monomers exhibiting different solubility in the solvent.

16 Claims, 5 Drawing Sheets

(56) References Cited

OTHER PUBLICATIONS

Chong, Y.; Le, T.P.; Moad, G.; Rizzardo, E.; Thang, S.H. A more versatile route to block copolymers and other polymers of complex architecture by living radical polymerization: the RAFT process. Macromolecules 1999, 32 2071-2074.

Moad, G.; Rizzardo, E.; Thang, S.H. Living radical polymerization by the RAFT process. Australia Journal of Chemistry 2005, 58, 379-410.

Jeong, B.; Bae, Y.H.; Lee, D.S.; Kim, S.W. Biodegradable block copolymers as injectable drug-delivery systems. Nature 1997, 388, 860-862.

Ghoroghchian, P.P.; Frail, P.R.; Susumu, K.; Blessington, D.; Brannan, A.K.; Bates, F.S.; Chance, B.; Hammer, D.A.; Therien, M.J. Near-infrared-emissive polymersomes: self-assembled soft matter for the vivo optical imaging. Proceedings of the National Academy of Sciences of the United States of America 2005, 102, 2922-2927.

Sanson, C.; Diou, O.; Thevenol, J.; Ibarboure, E.; Soum, A.; Brulet, A.; Miraux, S.; Thiaudiere, E.; Tan, S.; Brisson, A. Doxorubicin loaded magnetic polymersomes: theranostic nanocarriers for MR imaging and magneto-chemotherapy. ACS nano 2011, 5, 1122-1140.

Peinemann, K.V.; Abetz, V.; Simon, P.F. Asymmetric superstructure formed in a block copolymer via phase separation. Nature materials 2007, 6, 992-669.

Yang, S.Y.; Ryu, I.; Kim, H.Y.; Kim, J.K.; Jang, S.K.; Russell, T.P. Nanoporous membranes with ultrahigh selectivity and flux for the filtration of viruses. Advanced materials 2006, 18, 709-712.

Chaduc, I.; Zhang, W.; Rieger, J.; Lansalot, M.; D'Agosto, F.; Charleux, B. Amphiphillic Block Copolymers from a Direct and One-pot RAFT symthesis in Water. Macromolecular rapid communications 2001, 32, 1270-1276.

Dreher, W.R.; Jarrett, W.L.; Urban, M.W.; Stable nonspherical fluorine-containing colloidal dispersions: synthesis and film formation. Macromolecules 2005, 38, 2205-2212.

Misra, A.; Urban, M.W. Acom-Shape Polymeric Nano-Collids: Synthesis and Self-Assembled Films. Macromolecular rapid communications 2010, 31, 119-127.

Corten, C.C.; Urban, M.W.; Shape evolution control of phase-separated colloidal nanoparticles. Polymer Chemistry 2011, 2, 244-250.

Lu, C.; Urban, M.W. Tri-phasic size-and janus balance-tunable colloidal nanoparticles (JNPs). ACS Macro Letters 2014, 3, 346-352.

Lu, C.; Urban, M.W. Rationally Designed Gibbous Stimuli-Responsive Colloidal Nanoparticles. ACS nano 2015, 9, 3119-3124.

Lu, Chunliang; M. W. Urban. Instantaneous Directional Growth of Block Copolymer Nanowires During Heterogeneous Radical Polymerization (HRP). Nano Lett. 2016, 16, 2873-2877.

Lu, Chunliang; M. W. Urban. One-Step Synthesis of Amphiphilic Ultrahigh Molecular Weight Block Copolymers by Surfactant-Free Heterogeneous Radical Polymerization. ACS Macro Lett. 2015, 4, 1317-1320.

Inglis, Andrew J,; Martina H. Stenzel; Christopher Barner-Kowollik. Ultra-Fast RAFT-HDA Click Conjugation: An Efficient Route to High Molecular Weight Block Copolymers. Macromol Rapid Commun. 2009, 30, 1792-1798.

Percec, Virgil; Tamaz Guliashvili; Janine S. Ladislaw; Anna Wistrand; Anna Stjerndahl; Monika J. Sienkowska; Michael J. Monteiro; Sangrama Sahoo. Ultrafast Synthesis of Ultrahigh Molar Mass Polymers by Metal-Catalyzed Living Radical Polymerization of Acrylates, Methacrylates, and Vinyl Chloride Mediated by SET at 25° C. J. Am. Chem. Soc. 2006, 128, 14156-14165.

Runge, M. Brett; Ned B. Bowden. Synthesis of High Molecular Weight Comb Block Copolymers and Their Assembly into Ordered Morphologies in the Solid State. J. Am. Chem. Soc. 2007, 129, 10551-10560.

Rzayev, Javid; Jacques Penelle. HP-RAFT: A Free-Radical Polymerization Technique for Obtaining Living Polymers of Ultrahigh Molecular Weights. Angew. Chem. Int. Ed. 2004, 43, 1691-1694.

ONE STEP SYNTHESIS OF ULTRAHIGH MOLECULAR WEIGHT BLOCK COPOLYMERS

CROSS REFERENCE TO RELATED APPLICATION

This application claims filing benefit of U.S. Provisional Patent Application Ser. No. 62/420,221 having a filing date of Nov. 10, 2016, which is incorporated herein by reference for all purposes.

STATEMENT REGARDING FEDERALLY SPONSORED RESEARCH OR DEVELOPMENT

This invention was made with government support under Grant No. CMMI-1332964 awarded by the National Science Foundation. The government has certain rights in the invention.

BACKGROUND

A common approach for obtaining a product that combines desirable properties of different polymers is to mix individual homopolymers and achieve a blend exhibiting the desired combination of functions. Unfortunately, thermodynamic incompatibility of homopolymers often causes interfacial instability and phase separation of polymer blends resulting from the reduced van der Waals or other intermacromolecular interactions. An obvious strategy to overcome these obstacles is to covalently attach immiscible homopolymer segments to one another to form a stable block copolymer backbone that maintains the properties of each homopolymer segment.

For almost two decades, controlled radical polymerization (CRP) has dominated the field of polymer synthesis. Due to pseudo-living features, CRP methods including nitroxide-mediated polymerization (NMP), atom transfer radical polymerization (ATRP), and reversible addition-fragmentation chain transfer (RAFT) polymerization have facilitated thermodynamically controlled conditions for the synthesis of well-defined block copolymers with a narrow dispersity. These advances have enabled many applications, ranging from drug delivery systems to diagnostic imaging processes, new separation membranes, and others. While CRP methods have brought improvement to the field, problems still exist. Drawbacks of CRP methods include time-consuming synthesis, multiple purification steps, and molecular weight limitations. For instance, existing CRP block copolymer synthetic methods can produce a maximum block copolymer molecular weight of about 200,000 and the process takes several days or longer.

Emulsion polymerization is a copolymer formation approach that is well suited for the synthesis of ultrahigh molecular weight polymers. Unfortunately, limited copolymer composition control and high dispersity have presented significant drawbacks. Due to fast kinetics of initiation, propagation, and termination steps, copolymer structural control during this statistical polymerization is difficult to achieve.

What are needed in the art are methods for forming high molecular weight block copolymers. One-step methods that can be carried out quickly and produce ultrahigh molecular weight block copolymers with high reproduction consistency would be of great benefit in the art.

SUMMARY

A method for forming ultrahigh molecular weight amphiphilic block copolymers is described. A method includes combining a first monomer and a second monomer in a solvent. The first monomer exhibits greater solubility in the solvent as compared to that of the second monomer. In particular, the solubility of the second monomer can be low enough in the solvent that the second monomer aggregates to form dispersed droplets within the solvent. The monomers are added to the solvent such that the concentration of the first monomer in the solvent is greater than the concentration of the second monomer in the solvent. The method also includes adding a polymerization initiator to the mixture of the monomers and the solvent. The initiator is soluble in the solvent (e.g., thermally soluble in the solvent) and is added slowly, e.g., at a rate of about 0.1 mg/min or less. As the initiator is added, polymerization can occur according to a kinetically controlled propagation in stages including a first stage during which the first dispersed monomer is polymerized followed by a second stage during which the second aggregated monomer is polymerized, forming high molecular weight block copolymers.

Beneficially, the method can form extremely high molecular weight block copolymers (e.g., having a number average molecular weight of about $10^6$ or higher) and can do so quickly (in a matter of hours) and can be surfactant free. For instance, in one embodiment, the method can be carried out by use of only the solvent (e.g., water), two monomers, and an initiator.

DETAILED DESCRIPTION

Figure 1:
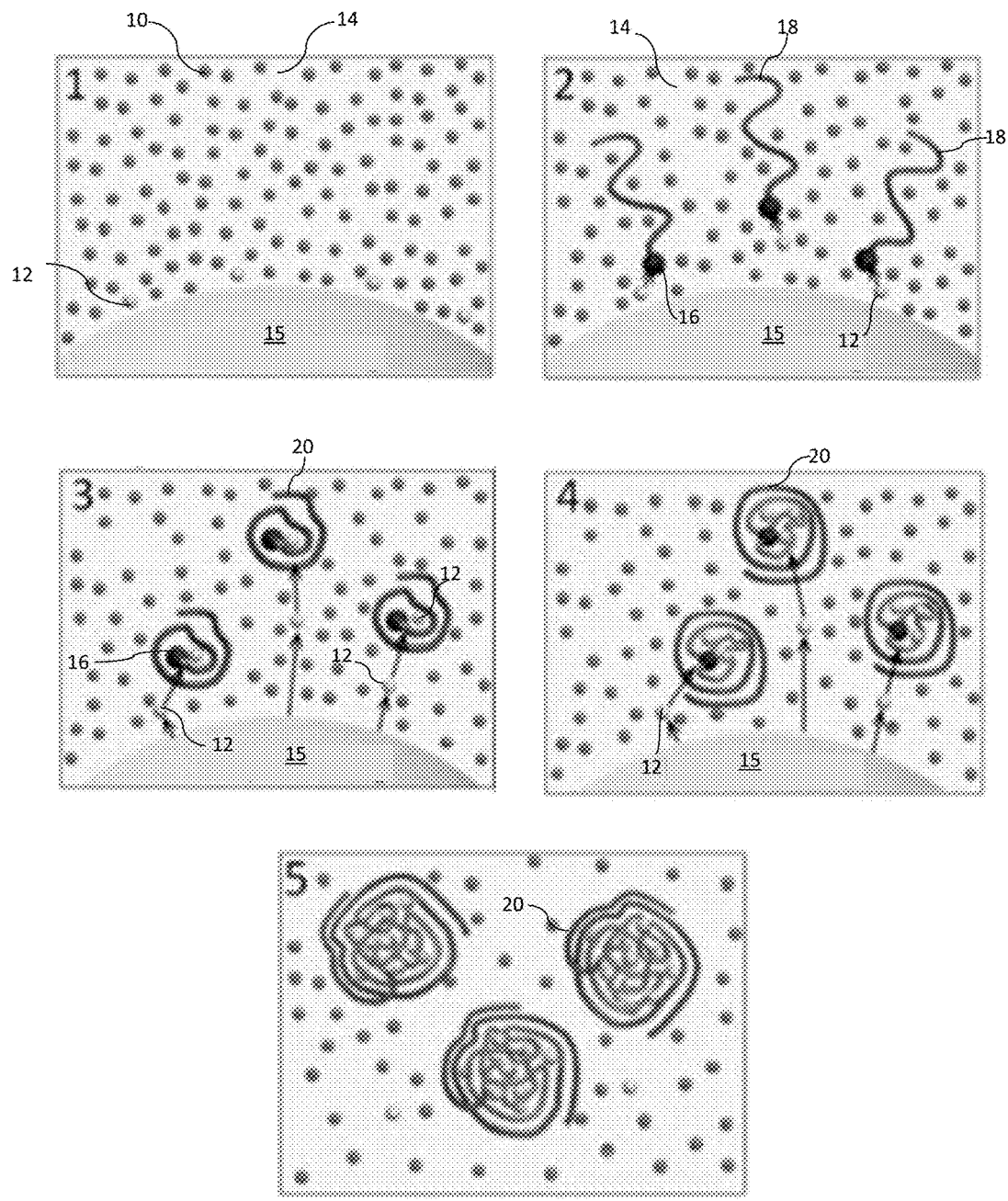
FIG. 1 provides a schematic illustration of a synthesis as described herein forming amphiphilic ultrahigh molecular weight block copolymers.

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

Disclosed are inexpensive single-step synthesis processes that can produce molecular weight block copolymers having ultrahigh number average molecular weights. As utilized herein, the term ultrahigh molecular weight generally refers to a number average molecular weight of about 500,000 or greater, about 750,000 or greater, about 900,000 or greater, or about $10^6$ or greater in some embodiments. Beneficially, the polymerizations can be carried out to produce the ultrahigh molecular weight block copolymers within a few hours, e.g., about 6 hours or less, or from about 30 minutes to about 3 hours in some embodiments. Moreover, the methods can not only be carried out in a single step in a matter of hours, but can also be carried out in a surfactant-free environment, i.e., free of any amphipathic or amphiphilic components that are often utilized in emulsion polymerization processes to improve formation characteristics of the nascent block copolymers.

The methods are capable of producing copolymers with well-defined block morphologies and exceptional properties. The ultrahigh molecular weight block copolymers can offer numerous advantages not usually observed in homopolymers. For example, melting point, transition temperatures, tensile strength, moduli, and elastic properties that depend upon the structural arrangement of the molecular units from which a copolymer is composed can all be enhanced by use of the formation methods. Properties of the block copolymers can likewise be superior to those of random copolymers as the ultrahigh molecular weight block copolymers can retain desirable properties of each of the homopolymers from which they are derived as well as exhibiting desirable properties of the high molecular weight structure itself.

Another benefit of the ultrahigh molecular weight block copolymers formed by use of the methods is that they can self-assemble in response to solvent variation, temperature variation, etc. to form inverse polymeric micelles (e.g., thermochromic inverse micelles). The formation methods can also be tightly controlled to affect morphology of the products and provide the block copolymers with predetermined shapes (e.g., spherical, branched, nanowires, etc.).

The reproducibility of the methods can provide consistency in the properties of the product block copolymers (e.g., mechanical, electrical, and optical properties), which can provide substantial benefits in many technology areas. The block copolymers can exhibit beneficial applicability in many industrial uses, for instance in nanotechnology-based applications. Applicability of the ultrahigh molecular weight block copolymers in nanotechnology applications as well as other fields stems from the scale of the microdomains and the convenient tunability of size, shape, and periodicity that can be facilitated by controlled modification of the block molecular parameters as provided by disclosed methods.

The formation methods are based upon emulsion polymerization. The heterogeneous nature of emulsion polymerization facilitates an opportunity for controlling the diffusion of propagating polymeric radicals into the separated hydrophilic and hydrophobic phases of an emulsion polymerization process. More specifically, by developing a route for kinetic control of sequential polymerization of hydrophilic and hydrophobic monomers in the heterogeneous environments of emulsion polymerization, the ultrahigh molecular weight amphiphilic block copolymers can be developed with high consistency.

The emulsion polymerization formations are based on heterogeneous radical polymerization schemes that utilize sequential copolymerization of phase-separated hydrophilic and hydrophobic monomers controlled by initiator-starvation conditions. The sequential polymerization includes formation of soluble homopolymer blocks via polymerization of a first monomer that is soluble in the solvent followed by copolymerization of the soluble homopolymer blocks with a second monomer, the second monomer being substantially less soluble in the solvent as compared to the first monomer. A slow and continuous or semi-continuous supply of an initiator in conjunction with a relatively high concentration of the first monomer in the solvent can be used to control the polymerization process.

FIG. 1 is a schematic diagram of one embodiment of the heterogeneous radical polymerization process. As shown in panel 1 of FIG. 1, initially, a first monomer 10 (M1) and a second monomer 12 (M2) are combined in a solvent 14. In one embodiment, the solvent 14 can be a polar solvent, and in one particular embodiment, the solvent can be water. While this disclosure is primarily directed to an aqueous solvent, it should be understood that the solvent is not limited to any particular solvent.

The first and second monomers 10, 12 can differ from one another with regard to solubility in the solvent at the polymerization conditions. In particular, the first monomer 10 can be significantly more soluble in the solvent as compared to the second monomer 12. For instance, the second, less soluble monomer 12 can exhibit a solubility in the solvent at the reaction conditions of about 20 g/L or less, about 5 g/L or less, about 0.5 g/L or less, or about 0.2 g/L or less. In some embodiments, the second monomer 12 can be essentially insoluble in the solvent 14 at the reaction conditions. As such, upon combining the first and second monomers 10, 12 in the solvent 14, the second monomer 12 can aggregate to form large aggregates or droplets 15 within the mixture. In the case of an aqueous solvent 14, the droplets 15 can then define a separated hydrophobic phase within the hydrophilic solvent and vice versa for a non-aqueous, hydrophobic or lipophilic solvent.

The first monomer 10 can also exhibit higher reactivity toward itself than to the second monomer. For instance the reactivity of the first monomer toward itself can be about 1 or greater whereas the reactivity of the first monomer toward the second monomer can be about 1 or less. In other words, the ratio of the reactivity for the reaction of M1+M1→M1-M1 to the reactivity for the reaction of M1+M2→M1-M2 can be greater than 1.

In addition to high solubility in the solvent at the reaction conditions, the first monomer 10 can include charged (or chargeable) groups so as to form polymeric blocks that can maintain colloidal stability in the solvent by electrostatic repulsion. For instance, the first monomer 10 can include tertiary amine groups or the like capable of protonation. As such, upon initial homopolymerization of the first monomer, optionally in conjunction with creation of conditions to encourage static charge on the groups, as necessary, these monomer blocks (pM1) can spontaneously form stable polymeric micelles in the solvent 14.

By way of example, and without limitation, water soluble monomers as may be utilized in a system (e.g., as M1 in an aqueous-based system) can include ethylenically unsaturated monocarboxylic and dicarboxylic acids, such as acrylic acid, methacrylic acid, itaconic acid, maleic acid or fumaric acid, unsaturated carboxylic acid amides, such as acrylamide, methacrylamide, N-methylolacrylamide or—methacrylamide; N-alkylacrylamides, vinylamine amides such as vinylformamide, vinylacetamide, N-vinylpyrrolidone and N-vinylcaprolactam.

Examples of hydrophilic monomer can include, without limitation, N,N-dimethylaminomethylacrylamide or -methacrylamide, 2-(N,N-dimethylamino)ethylacrylamide or -methacrylamide, 3-(N,N-dimethylamino)propylacrylamide or -methacrylamide, 4-(N,N-dimethylamino)butylacrylamide or -methacrylamide, vinylformamide, vinylacetamide, N-vinylpyrrolidone and N-vinylcaprolactam; α,β monoethylenically unsaturated amino esters, such as 2-(dimethylamino)ethyl acrylate (ADAM), 2-(dimethylamino)ethyl methacrylate (DMAM or MADAM), 3-(dimethylamino) propyl methacrylate, 2-(tert-butylamino)ethyl methacrylate, 2-(dipentylamino)ethyl methacrylate, or 2-(diethylamino) ethyl methacrylate, vinylpyridines, vinylamine, vinylimidazolines, as well as any combinations thereof.

Monomers can include precursors of amine functions, such as N-vinylformamide or N-vinylacetamide that can generate primary amine functions by simple acid or basic hydrolysis as well as ammoniumacryloyl or acryloyloxy monomers, trimethylammoniumpropylmethacrylate salts, trimethylammoniumethylacrylamide or -methacrylamide chloride or bromide, trimethylammoniumbutylacrylamide or -methacrylamide methylsulfate, trimethylammoniumpropylmethacrylamide methylsulfate (MAPTA MeS), (3-methacrylamidopropyl)trimethylammonium chloride (MAPTAC), (3-acrylamidopropyl)trimethylammonium chloride or methylsulfate (APTAC or APTA MeS), methacryloyloxyethyltrimethylammonium chloride or methylsulfate, cryloyloxyethyltrimethylammonium (ADAMQUAT) salts, methyldiethylammoniumethyl acrylate methylsulfate (ADAEQUAT MeS), benzyldimethylammoniumethyle acrylate chloride or methylsulfate (ADAMQUAT BZ 80), 1-ethyl 2-vinylpyridinium bromide, chloride or methylsulfate or 1-ethyl 4-vinylpyridinium bromide, chloride or methylsulfate, N,N-dialkyldiallylamine monomers, such as N,N-dimethyldiallylammonium chloride (DADMAC), dimethylaminopropylmethacrylamide, N-(3-chloro-2-hydroxypropyl) trimethylammonium chloride (DIQUAT chloride), dimethylaminopropylmethacrylamide, N-(3-methylsulfate-2-hydroxypropyl)-trimethylammonium methylsulfate (DIQUAT methylsulfate), monomers carrying at least one vinyl phosphonate function, such as vinylphosphonic acid, vinylphosphonic acid dimethyl ester, vinylphosphonic acid bis(2-chloroethyl) ester, vinylidenediphosphonic acid, vinylidenediphosphonic acid tetraisopropyl ester or alpha-styrenephosphonic acid, or mixtures thereof, and mixtures and combinations of two monomers.

For example, in one embodiment a hydrophilic monomer such as 2-(N,N-dimethylamino) ethyl methacrylate (DMAEMA) can be utilized due to its high water solubility and reactivity as well as colloidal stability provided by tertiary amine groups.

Referring again to panel 1 of FIG. 1, the second monomer 12 exhibits very low or essentially no solubility in the solvent 14. For example, a hydrophobic monomer 12 can exhibit water solubility of about 20 g/L or less. As such the second monomer 12 can form phase-separated droplets 15.

Representative examples of monomers that exhibit low solubility in an aqueous solvent, i.e., hydrophobic monomers, can include, without limitation C2-C40-alkyl esters of acrylic acid and C1-C40-alkyl esters of methacrylic acid, for example methyl methacrylate, ethyl acrylate, ethyl methacrylate, n-propyl acrylate, isopropyl acrylate, isopropyl methacrylate, n-butyl acrylate, n-butyl methacrylate, isobutyl acrylate, isobutyl methacrylate, tert-butyl acrylate, pentyl acrylate, pentyl methacrylate, n-hexyl acrylate, n-hexyl methacrylate, n-heptyl acrylate, n-heptyl methacrylate, n-octyl acrylate, n-octyl 30 methacrylate, 2-ethylhexyl acrylate, 2-ethylhexyl methacrylate, decyl acrylate, decyl methacrylate, lauryl acrylate, lauryl methacrylate, palmityl acrylate, palmityl methacrylate, stearyl acrylate, stearyl methacrylate, hydrenol (meth)acrylate, behenyl (meth)acrylate, polyisobutene (meth)acrylate, phenoxyethyl 35 acrylate, phenoxyethyl methacrylate, phenyl acrylate and phenyl methacrylate.

Additional examples of hydrophobic monomers for use in forming an ultrahigh molecular weight block copolymer can include C2-C30 α-olefins and polyisobutylenes having from 3 to 50 isobutene units. Other examples of hydrophobic monomers include vinylaromatic compounds, such as styrene and α-methylstyrene, vinylpyridines such as 4-vinylpyridine, polypropylenes having a terminal vinyl or vinylidene group having from 3 to 100 propylene units, polyisobutene having a terminal vinyl or vinylidene group, oligohexene or oligooctadecene. Also encompassed are N-alkyl-substituted acrylamides and methacrylamides, C1-C40 vinyl alkyl ethers and also the corresponding allyl ethers, water-insoluble acids or esters of maleic acid and fumaric acid, vinyl esters of saturated C3-C40-carboxylic acids, methacrylonitrile, vinyl chloride, vinylidene chloride, isoprene and butadiene. Combinations of one or more hydrophobic monomers can also be utilized.

Due to low surface energy, halogen containing vinyl monomers, and in particular fluorine containing vinyl monomers, represent a significant challenge in copolymerization, particularly under high surface tension aqueous conditions. Disclosed methods can provide a viable and efficient method for copolymerizing halogen-containing monomers. For example, in an aqueous system, the second monomer 12 can encompass halogen containing vinyl monomers such as fluorine containing acrylates or methacrylates including any of a variable number of fluorocarbons on the monomers and product copolymer blocks.

Amphiphilic polymers containing fluorinated blocks as may be formed by the methods can offer a number of useful properties due to their hydrophilicity and/or oleophobicity. As the formation method can be carried out in the absence of any surfactant, the product block copolymers can be formed without adverse effects of surfactants and can exhibit useful physical properties typically not achievable in non-fluoro-containing copolymers.

Referring again to FIG. 1, to encourage the sequential polymerization of the monomers, in addition to the variability in solubility, the soluble first monomer 10 is combined with the second monomer 12 in the solvent 14 such that the concentration of the first monomer 10 is greater than that of the second monomer 12. For instance, the add-in molar ratio of the first monomer 10 to the second monomer 12 M1:M2 can be about 2:1 or higher. For instance, the starting molar ratio of M1:M2 can be from about 1:0.02 to about 1:0.5, from about 1:0.03 to about 1:0.3, or from about 1:0.01 to about 1:0.1 in some embodiments. Upon combination, the first monomer 10 will remain dispersed in the solvent and the second monomer 12 will aggregate to form phase separated droplets 15 within the mixture.

To initiate polymerization (panel 2 of FIG. 1), an initiator 16 is added to the mixture. The initiator 16 is a radical polymerization initiator as is known in the art that is soluble in the solvent 14 at the reaction conditions. By way of example, an initiator 16 can include, without limitation, water soluble polymerization initiators including hydrogen peroxides such as: tert-butyl hydroperoxide, cumene hydroperoxide, t-butyl peroxyacetate, t-butyl peroxybenzoate, t-butyl peroxyoctoate, t-butyl peroxyneodecanoate, t-butyl peroxyisobutyrate, lauroyl peroxide, t-amyl peroxypivalate, t-butyl peroxypivalate, dicumyl peroxide, benzoyl peroxide, potassium persulfate, ammonium persulfate; azo compounds such as: 2-2'-azobis(isobutyronitrile), 2,2'-azobis(2-butanenitrile), 4,4'-azobis(4-pentanoic acid), 1,1'-azobis (cyclohexanecarbonitrile), 2-(t-butylazo)-2-cyanopropane, 2,2'-azobis[2-méthyl-N-(1,1)-bis(hydroxymethyl)-2-hydroxyethyl]propionamide, 2,2'-azobis(2-methyl-N-hydroxyethyl)propionamide, 2,2'-azobis(N,N'-dimethyleneisobutyramidine)dichloride, 2,2'-azobis(2-am idinopropane)dichloride, 2,2'-azobis(N,N'-diméthyleneisobutyramide), 2,2'-azobis(2-methyl-N-[1,1-bis(hydroxymethyl)-2-hydroxyethyl]propionamide), 2,2'-azobis (2-methyl-N-[1,1-bis(hydroxymethyl)ethyl]propionamide), 2,2'-azobis[2-methyl-N-(2-hydroxyethyl)propionamide], 2,2'-azobis[2-(2-imidazolin-2-yl)propane]dihydrochloride (AIPD), or 2,2'-azobis(isobutyramide)dehydrate; redox systems comprising combinations such as mixtures of hydrogen peroxide, alkyl peroxide, peresters, percarbonates and the like and any iron salts, titanous salts, zinc formaldehyde sulfoxylate or sodium formaldehyde sulfoxylate, and reducing sugars; alkali metal or ammonium persulfates, perborate or perchlorate in combination with an alkali metal bisulfite, such as sodium metabisulfite, and reducing sugars, and alkali metal persulfates in combination with an arylphosphinic acid, such as benzenephosphonic acid and the like.

In those embodiments in which halogenated block copolymers are formed, initiators commonly employed in polymerization of halogenated copolymers by previously known methods can be utilized. Examples include water-soluble free-radical initiators such as ammonium persulfate (APS), potassium persulfate (KPS), disuccinic acid peroxide, and redox systems such as those based on potassium permanganate ($KMnO_4$), or a perfluoroalkyl sulfinate salt plus an oxidizing agent.

Initiators for polymerization in a nonaqueous phase can include perfluoropropionyl peroxide (3P) and $(CF_3CF_2CF_2OCF(CF_3)COO^-)_2$ (hexafluoropropylene oxide dimer peroxide, also known as HFPO dimer peroxide).

To control the polymerization kinetics and encourage the sequential polymerization of the monomers, the initiator 16 is added to the mixture slowly. For instance, the initiator can be add to the reaction mixture at a rate of about 0.1 mg/min or less in either a continuous or discontinuous fashion (e.g., drop-wise). By maintaining low concentration of the initiator through slow addition to the reaction mixture, low concentration levels of free radicals can be maintained. In contrast to CRP, the disclosed process does not rely on reversible deactivation. Instead, the process utilizes kinetically controlled propagation stages involving the sequential polymerization of the monomers. As such, the statistical copolymer growth of CRP can be eliminated.

As shown in panel 2 of FIG. 1, due to the relatively high concentration of the soluble monomer 10, the preferential reactivity of the first monomer 10 for itself, and the aggregation of the low solubility monomer 12, the slow addition of the initiator 16 can facility the initial polymerization of the first monomer 10 (M1) to form homopolymer blocks pM1• 18 in the solvent. For instance, polymerization of M1 in an aqueous phase can be initiated by hydrophilic radicals resulting from thermal decomposition of a water-soluble initiator as illustrated. This initial polymerization defines a first propagation stage that involves polymerization of the first polymer 10 to form hydrophilic radical-terminated pM1• blocks 18 in the aqueous phase.

As polymerization of the first monomer continues, the relatively high concentration of the first monomer 10 will decrease, and statistically, copolymerization of the second monomer 12 M2 on the end of the pM1 chains 18 can occur as illustrated in panel 2 of FIG. 1. The growing $p(M1)_m$-M2• polymer chain ends can become hydrophobic, resulting in the formation of copolymeric micelles 20 that include external pM1 hydrophilic blocks and interior hydrophobic pM2• ends (panel 3 of FIG. 1).

Upon development of the two-phase micelles, hydrophobic second monomer 12 in the solution can diffuse into the hydrophobic interior of the micelles 20. The continuous diffusion of the second monomer 12 from the monomer aggregate droplets 15 into the hydrophobic core of the micelles 20 and polymerization site is understood to be driven by chemical potential differences combined with the high surface area of the forming polymeric micelles 20. The continuous diffusion of the second monomer 12 into the reaction loci facilitates the second stage copolymerization of hydrophobic blocks as illustrated at panel 4 of FIG. 1. As the polymerizing hydrophobic radicals pM2• are protected by hydrophilic pM1 segments, the possibility of bimolecular termination is minimized. Termination of the block copolymer may occur by disproportionation and combination, resulting in a pM1-pM2 diblock or a pM1-pM2-pM1 triblock copolymer, as illustrated in panel 5 of FIG. 1.

In order to control the desired kinetics and sequential polymerization stages, significantly higher concentration levels of the first monomer 10 can be maintained throughout the copolymerization process. For instance, the ratio of the molar concentrations of the soluble monomer M1 to the second monomer M2 can be about 1:2, about 1:5, about 1:10, or even higher at about 70% conversion.

In one embodiment, the reaction conditions can be controlled so as to control the morphology of the ultrahigh molecular weight block copolymers. For example, in one embodiment, the difference in solubility can be exceptionally great, with the second monomer exhibiting essentially no solubility in the solvent of the reaction mixture. In this embodiment, as polymerization progresses, the nascent block copolymer nanoparticles can exhibit directional growth due to localized repulsive forces of the hydrophilic blocks and confinement of the hydrophobic blocks. For example in one embodiment, the ultrahigh molecular weight block copolymers can adopt high aspect ratio nanowire morphologies.

Because individual polymer moieties can provide more versatile control of properties, ultrahigh molecular weight high aspect ratio block copolymer nanoparticles (e.g., nanowires) that can exhibit high stability can be useful in numerous applications, including as nanocarrier drug delivery systems, therapeutics, lithographic and optoelectronic applications, templating materials, and sensing devices, to name just a few. In the past, high aspect ratio polymers have been obtained via self-assembly of block copolymers synthesized by living cationic/anionic/ring-opening or controlled radical polymerizations (CRPs). Disclosed methods can provide block copolymers with designed morphology such as high aspect ratio block copolymer nanoparticles in the single-step process more quickly and at much lower cost.

Figure 2:
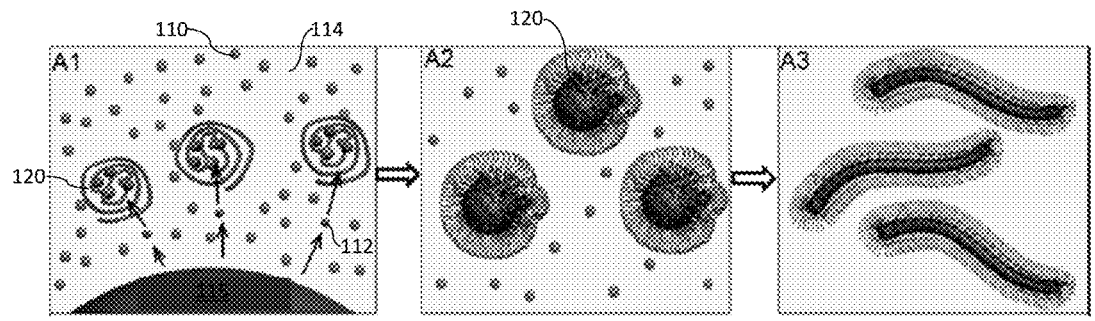
FIG. 2 provides a schematic illustration of in situ self-assembly of block copolymers to form non-spherical copolymers.

As illustrated in panel A1 of FIG. 2, formation of high aspect ratio ultrahigh molecular weight block copolymers can be initiated similar to that of spherical nanoparticles as depicted in FIG. 1. For example, the high aspect ratio nanoparticles can be formed by copolymerization of a water-soluble first monomer 110 (M1) and a hydrophobic second monomer 112 (M2) dispersed in an aqueous phase 114 by slow addition of a water-soluble initiator. As with the general copolymerization process, low concentration levels of radicals are maintained by slow addition of the initiator to facilitate kinetically controlled reaction conditions. To preferentially form the high aspect ratio nanoparticles, the monomer solubility differences in the reaction media can be quite large. In particular, when these differences are sufficiently large, repulsive forces between hydrophilic blocks and chain arrangements of the hydrophobic blocks can facilitate water dispersity and lead to the development of nanowire morphologies during the second stage of the copolymerization process. In general, to facilitate formation of high aspect ratio nanoparticles, the second monomer 112 can be essentially insoluble in the solvent. Panel A1 of FIG. 2 depicts a schematic diagram of initial polymeric nanoparticle formation, which upon further polymerization, results in the directional growth as shown at panel A2 of FIG. 2, leading to the formation of polymeric nanowires as illustrated at panel A3 of FIG. 2.

Figure 3:
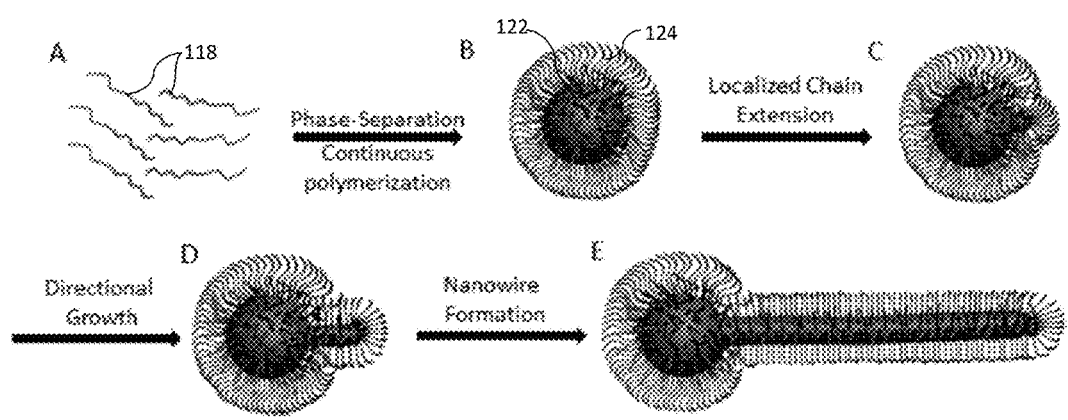
FIG. 3 presents a schematic representation of nanowire directional growth of a block copolymer.
Figure 5:
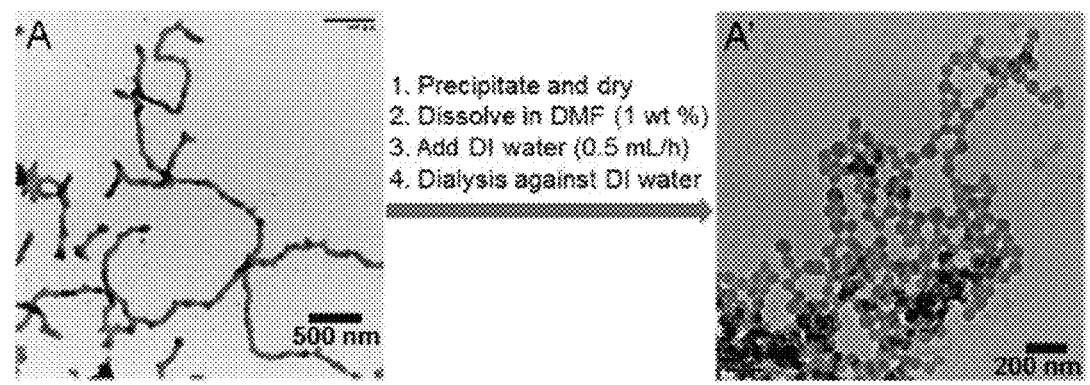
FIG. 5 provides TEM images of nanowire block copolymer micelles formed as described (left) and the corresponding thermodynamically self-assembled spherical micelles formed from the initial micelles following solvent displacement (right).

Without wishing to be bound to any particular theory, FIG. 5 schematically demonstrates what is believed to be the mechanism for the in situ directional growth of block copolymer nanowires. At the initial stages of polymerization, block pM1-$b$-pM2 copolymer is produced by sequential copolymerization of soluble M1 to form pM1 blocks 118 followed by polymerization with the second monomer M2 as described previously (FIG. 3, panel A). The resulting amphiphilic block copolymers phase-separate forming polymeric nanoparticles that include a hydrophobic pM2 block 122 core and pM1 block corona 124 (FIG. 3, panel B).

The continuous diffusion of hydrophobic M2 monomers into the hydrophobic pM2 block 122 as well as newly formed pM1-M2• polymeric radicals in the phase-separated polymeric micelles facilitate the chain propagation of the amphiphilic polymeric radicals and the formation of pM1-$b$-pM2 block copolymers. The formation of higher amphiphilic block copolymer content (e.g., when the diameter of the core/shell nanoparticle exceeds about 73 nm, depending upon the specific materials involved) can lead to excessive repulsive forces of the pM1 blocks in the localized region as well as unfavorable extended state of pM2 blocks. Consequently, the chain propagation in the localized regions will lead to the formation of a protuberance (FIG. 3, panel C) that can relieve the localized excess of the repulsive forces in the corona 124 and thermodynamically unfavorable chain extended state in the core 122. The continuous formation and diffusion of p(M1)$_n$M2• as well as the sequential chain propagation in the protuberance can be confined to one-dimension to maintain favorable chain extending in diameter (e.g., about 73 nm or less), thus facilitating the directional growth to form an embryo-like tails (FIG. 3, panel D). During polymerization, the pM2 blocks can retain favorable arrangements along the direction normal to the growing tail, thus resulting in block copolymer high aspect ratio nanowires (FIG. 3, panel E).

Ultrahigh molecular weight high aspect ratio block copolymers formed by the disclosed methods may serve as structural components of higher order biological constructs, ranging from single strand nanowires to engineered biomolecular networks capable of responding to diverse and transient environmental signals.

Unlike post-polymerization kinetic manipulation of charged, amphiphilic low molecular weight block copolymers to form organizational structures, which rely on solvent properties, counterions, or others, the disclosed methods that can provide for the growth of high aspect ratio structures during polymerization of the ultrahigh molecular weight copolymers. This can offer numerous formation advantages including improvement in product consistency and product properties as well as significant cost savings.

Regardless of the final morphology of the ultrahigh molecular weight block copolymers, through selection of the particular monomers, the disclosed methods provide for formation of ultrahigh molecular weight block copolymer nanoparticles exhibiting a wide variety of useful properties including stimuli-responsiveness. For instance, through formation of a high aspect ratio ultrahigh molecular weight block copolymer with monomer blocks exhibiting differences in critical solution temperatures, the formed nanowires can alter in size and/or shape upon temperature modification. Moreover, the ultrahigh molecular weight block copolymers can exhibit limited solubility and excellent resistance to extreme conditions (e.g., temperature) and thus can be useful in numerous applications.

The present disclosure may be better understood with reference to the Examples.

EXAMPLE 1

Amphiphilic block copolymers were synthesized of poly (2-(N,N-dimethylamino) ethyl methacrylate)-block-poly(n-butyl acrylate) (pDMAEMA-b-pnBA), pDMAEMA-block-p(tert-butyl acrylate) (pDMAEMA-b-tBA) and pDMAEMA-block-polystyrene (pDMAEMA-b-pSt) with molecular weights of $1.98 \times 10^6$, $1.18 \times 10^6$, and $0.91 \times 10^6$ g/mol, respectively.

Materials.

2-(Dimethylamino)ethyl methacrylate (DMAEMA, 98%), n-butyl acrylate (nBA, 99%), t-butyl acrylate (tBA, 99%), styrene (St, 99%), N,N-dimethylformamide (DMF, 99.8%), DMF-d7 (99.5 at. % D), and aluminum oxide ($Al_2O_3$, activated, basic) were purchased from Aldrich Chemical Co. Water-soluble initiator 2,2'-azobis[2-(2-imidazolin-2-yl)propane] dihydrochloride (AIPD) was purchased from Wako Pure Chemicals Ind. Ltd. Inhibitors in monomers were removed by passing through an $Al_2O_3$ column.

Synthesis of p(DMAEMA-block-nBA) Copolymers.

Deionized water (50 mL) was stirred at 600 rpm, deoxygenated by bubbling $N_2$ for 30 min, and heated to 75° C. DMAEMA (3.93 g, 25 mmol) was added and dissolved into a homogeneous solution. Then, nBA (3.2 g, 25 mmol) was added, and AIPD aqueous solution (3 mL×0.005 g/mL, 0.046 mmol) was fed over 3 h. After the beginning of initiator addition, the polymerization solution became bluish in 2 min and turned milky white in 5 min, indicating the formation of colloidal nanoparticles with a hydrophobic core. The reaction was allowed to run for another 30 min. The resulting emulsion was dialyzed (molecular weight cutoff (MWCO)=6-8 kDa) against water for 24 h and ethanol for 5 h to remove oligomers and unreacted monomers. The resulting polymers were precipitated in diethyl ether and dried in vacuum oven overnight at 65° C. Yield: 69%.

Starting with 0.51 M aqueous solution of DMAEMA, after polymerization was completed 0.15 M of the monomer was left. Approximately 70% monomer conversion was used to maintain high levels of water-soluble monomers in the aqueous phase. In contrast, the initial concentration levels of the hydrophobic nBA (solubility in water: 2 g/L) was less than 0.015 M. Considering the initial monomer concentration levels at approximately 70% conversion rate and the final molecular weight of the polymer, it was estimated that the initiator efficiency was about 0.26.

Preparation of Inverse Polymeric Micelles.

pDMAEMA-b-pnBA copolymers (0.6 g) and $H_2O$ (0.02 g) were added to 20 mL of toluene. The mixture was sonicated overnight, and purple/blue clear solution was obtained.

Molecular Weight Determination.

The molecular weight of the block copolymers was determined by an AF2000 Multiflow Organic Asymmetrical field flow fractionation (FFF) system equipped with a PN5300 autosampler for injection, a PN3621 Multi Angle Light Scattering detector, and a PN3150 RI detector using DMF as the solvent.

Characterization.

Particle size measurements were performed using a Malvern Zetasizer Nano-ZS equipped with a 633 nm laser, at a constant backscattering angle of 173° at 25° C. Inverse micelle morphologies were investigated using a Hitachi H9500 transmission electron microscope (TEM) operated at 300 kV, where the samples were diluted and deposited on a carbon-film-supported copper grid (EMS). $^1$H NMR spectra were obtained using a JEOL ECX-300 spectrometer operating at 300 MHz. All spectra were collected at 25° C. and referenced to tetramethylsilane or residual protium in the NMR solvent (DMF-d7:8.00). UV-vis spectra were obtained on a PerkinElmer Lambda 950 UV/vis/NIR spectrometer.

The block copolymer structures were verified by solubility measurements, differential scanning calorimetry (DSC), and $^1$H NMR analysis. The following features are characteristic of a pDMAEMA-b-pnBA copolymer:

(1) The presence of two $T_g$ at –39° C. and 47° C. In contrast, the solution polymerized p(DMAEMA-stat-nBA) exhibited one $T_g$ at –10.5° C.

(2) The α-methyl protons in the $^1$H NMR spectrum clearly showed no shielding by α-protons of the nBA units, indicating the block copolymer formation. The $^1$H NMR spectrum of solution polymerized p(DMAEMA-stat-nBA) copolymers showed significant shielding of α-methyl protons.

(3) The solubility differences between the copolymers formed as described and solution polymerized p(DMAEMA/nBA) copolymers showed that the pDMAEMA-b-pnBA block copolymer was soluble in DMF (a common solvent for both blocks), whereas p-(DMAEMA-stat-nBA) is soluble in many organic solvents.

EXAMPLE 2

Materials and Methods. Materials.

DMAEMA, 98%, St, 99%, and dimethylformamide (DMF) were purchased from Aldrich Chemical Co. Water-soluble AIPD initiator was purchased from Wako Pure Chemicals Ind. Ltd. Inhibitors in monomer solutions were removed by passing through an $Al_2O_3$ (activated, basic) column.

Synthesis of pDMAEMA-b-pSt Nanoparticles.

In a typical synthesis, deionized water (25 mL) was stirred at 300 rpm, deoxygenated by bubbling $N_2$ for 30 min, and heated to 75° C. DMAEMA (2.0 g, 12.5 mmol) was added and dissolved to form a homogeneous solution. Then, styrene (St) (feed amount according to the DMAEMA/St molar ratio) was added and 0.5 mL AIPD aqueous solution (0.0025 g/mL, 7.7 mM) was fed for over 30 min. The reaction was allowed to run for an additional 5 min and the resulting emulsion was directly used for characterization.

Self-assembly of pDMAEMA-b-pSt Copolymers in Water.

pDMAEMA-b-pSt copolymers were collected by centrifugation at 13500 rpm for 30 min and dried in vacuum oven at 70° C. overnight. Then, the dried block copolymers were dissolved in DMF (1.0 wt % in 1 mL), which is a good solvent for both polymer blocks. This homogeneous solution was stirred at 500 rpm using a magnetic stir bar for 15 h and water (DI, 5 mL) was dropwise added into the solution at a feed rate of 0.5 mL/h. At this point, the mixture was allowed to equilibrate for 2 h. Then, the copolymer dispersion was dialyzed (molecular weight cutoff (MWCO)=6-8 kDa) against deionized water for 3 days to remove DMF. The morphologies of the final products were observed directly using TEM.

Characterization.

The morphologies of the block copolymers were investigated using a Hitachi H9500 TEM operated at 300 kV. For that purpose, each specimen was diluted, followed by deposition on a Carbon-film supported Copper grid (EMS).

Nanoparticle/nanowire diameters were estimated by averaging the measurements from about 100 nanoparticle/nanowire TEM images and estimating their average diameter. $^1$H NMR spectra were recorded using a JEOL ECX-300 spectrometer operating at 300 MHz. All spectra were collected at 25° C. and referenced to tetramethylsilane or residual protium in the NMR solvent (DMF-d7:8.00). The molecular weight of the block copolymers were determined by AF2000 multiflow organic asymmetrical field flow fractionation system equipped with a PN5300 autosampler for injection, a PN3621 multiangle light scattering detector, and a PN3150 RI detector using DMF as the solvent.

Figure 4:
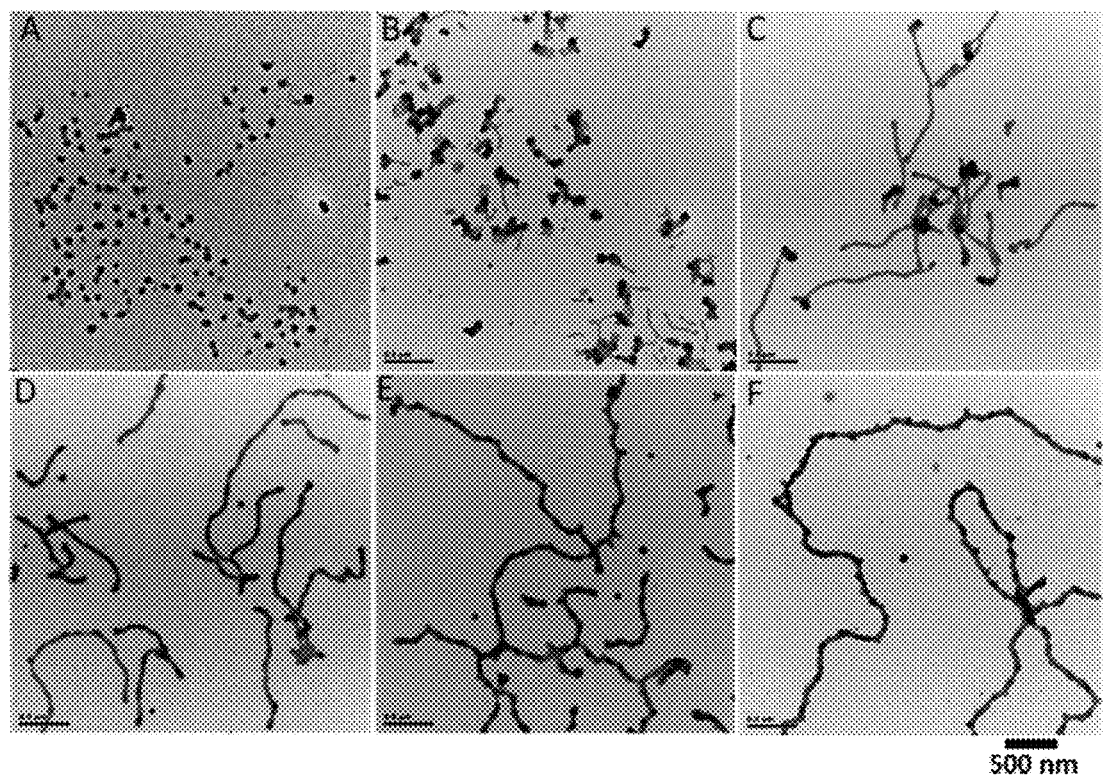
FIG. 4 provides transmission electron microscope (TEM) images of nanowires obtained from a one-step emulsion synthesis as a function of time.

FIG. 4 provides transmission electron microscope (TEM) images of nanowires obtained from a one-step emulsion synthesis as a function of time including 2.5 minutes (panel A), 5 minutes (panel B), 10 minutes (panel C), 15 minutes (panel D), 20 minutes (panel E), and 30 minutes (panel F) minutes. As shown in FIG. 4, the directional growth initiated at the nanoparticle level is clearly indicated. The reaction conditions resemble reversible deactivation radical polymerization (RDRP) conditions which, combined with the lack of deformability of the high $T_g$ blocks (pSt Tg~100° C.) at the given reaction temperature (75° C.), is believed to facilitate kinetically driven formation of the high molecular weight block copolymer nanowires.

To verify this hypothesis, dry pDMAEMA-b-pSt copolymer nanowires dried in a vacuum oven for about 15 h (FIG. 5, panel A) were dissolved in DMF solvent (1 wt %) to form a homogeneous solution. While stirring, deionized (DI) water (at 0.5 mL/h rate) was added. As shown in the left panel A' of FIG. 5, spherical, ~73 nm in diameter, nanoparticles were formed. This nanowire-to-nanoparticle conversion results in the formation of thermodynamically favorable nanoparticles thus indicating kinetically driven nanowire growth during polymerization. Notably, the diameter of the nanoparticles was approximately the same as the diameter of the nanowires (about 70 nm), indicating that the high $T_g$ polystyrene blocks of the nanowire hydrophobic core adopted chain arrangements normal to the nanowire longitudinal direction. Considering the molecular weight of the pDMAEMA-b-pSt block copolymers ($0.91 \times 10^6$ g/mol) and the diameter of the nanowires, the pSt blocks forming the core of the nanoparticles appear to adopt the most favorable unperturbed state when the nanoparticle diameter is less than about 60 nm. In contrast to the three-dimensional (3D) growth, continuous increase of nanoparticle diameter (greater than about 73 nm) suggests an entropically unfavorable state manifested by the directional 1D growth of initially spherical approximately 80 nm in diameter nanoparticles to approximately 70 nm diameter nanowires.

Figure 6:
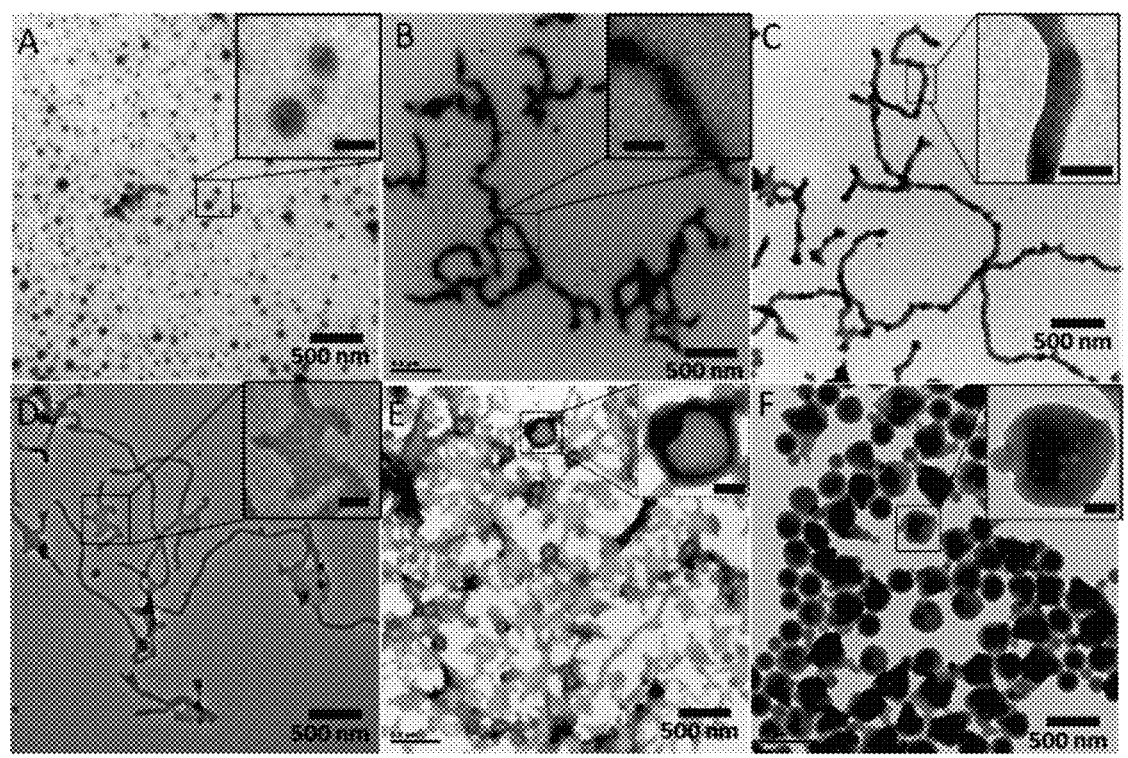
FIG. 6 provides TEM images of block copolymer micelles obtained via the one-step formation process with various molar ratios of the two copolymers. (Inset scale bar: 100 nm.)

To examine if other morphologies could be formed DMAEMA and St monomers were copolymerized with the monomers added to the reaction mixture at the following molar ratios: 1:0.1 (A), 1:0.16 (B), 1:0.2 (C), 1:0.33 (D) 1:0.5 (E), and 1:1 (F). The DMAEMA feed was constant at 0.51 M. Panels A-F of FIG. 6 illustrates the TEM images of the pDMAEMA-block-pSt copolymer morphologies produced. As shown in panel A of FIG. 6, when the DMAEMA/St molar ratio was 1:0.1, spherical morphologies with a diameter of about 80 nm were formed.

The reduction of the hydrophobic St feed ratio to less than 0.07 led to almost transparent solutions (not shown), indicating the lack of nanoparticle formation. As the St feed ratio increased to 0.16, short length (about 1 μm) nanowires with blurred boundaries were formed as shown in panel B, which was attributed to the hydrophilic corona formation that consisted of long pDMAEMA blocks. The TEM image in panel C illustrates linear nanowires produced when a 1:0.2 feed ratio was used. For 1:0.33 DMAEMA/St ratios, copolymerization resulted in the formation of branched nanowires (diameter about 68 nm) interconnected by lamellar structures shown in panel D. Further increase of the St feed amount led to the formation of a mixture of nanowire, lamellar micelles, and vesicles (panel E) as well as hollow nanoparticles (panel F).

EXAMPLE 3

Hydrophilic and fluorinated hydrophobic monomers were copolymerized to obtain ultra-high molecular weight block copolymers of polymethyl methacrylate-block-polypentafluoropropylmethacrylate (pMMA-b-PFPMA) (A), polymethyl methacrylate-block-polyheptafluorobutylacrylate (pMMA-b-HFBA) (B), polymethyl methacrylate-block-polyheptafluorobutylmethacrylate (pMMA-b-HFBMA) (C), polymethyl methacrylate-block-polyhexafluoroisopropylacrylate (pMMA-b-HFIPA) (D), and polymethyl methacrylate-block-polyhexafluoroisopropylmethacrylate (pMMA-b-HFIPMA) (E). Each fluorine monomer represented a different degree of fluorination, ranging from 2 to 3 fluorinated linear carbons (A, B and C) as well as isopropyl (D and E) structures.

To maintain the same hydrophilicity, methyl methacrylate (MMA) was used as the hydrophilic monomer, whereas the hydrophobic monomers represented the series of fluorinated acrylates and methacrylates ($M_F$) with the fluorinated carbon sidechains of $CF_2CF_3$, $CH(CF_3)_2$, and $CF_2CF_2CF_3$. As the number of fluorocarbons increased, higher hydrophobicity and sparse water solubility changed, thus affecting in-situ phase separation in the aqueous phase as well as polymerization kinetics of the block copolymer formation.

Materials

MMA, HFIPMA, AIBN, KPS, Chloroform-d, acetone-d6, dimethyl formamide (DMF), ethanol (EtOH), and trifluorotoluene (TFT) were purchased from Aldrich Chemical Co. PFPMA was purchased from Oakwood, HFBA, HFBMA, and HFIPA were purchased from Alfa Aesar. Toluene, dichloromethane (DCM), acetone, tetrahydrofuran (THF) were purchased from Fisher Chemical Co.

Monomers were deoxygenated by purging with $N_2$ gas at room temperature. The monomers were well dispersed in 25 mL deoxygenated DI water at 80° C. with stirring at 700 RPM in $N_2$ atmosphere. Deoxygenated KPS solution (0.001 g/mL) was fed semi-continuously with a syringe pump at a rate of 1 mL/h.

0.2 g MMA (M1), equivalent mole of the second monomer (M2), and 1~2 wt % AIBN were dissolved in 1 mL toluene in a 25 mL scintillation vial equipped with a magnetic stir bar. 0.5 g M2 was used in the polymerization of homopolymers. $N_2$ gas was purged through the vial for 3 min to remove oxygen, then the reaction mixture was warmed up to 65-70° C. for 16 hours. After the reaction was completed, solvent was removed under reduced pressure at 90° C. for 48 hr.

Characterization

Static light scattering was conducted on a Wyatt Dawn Heleos-II multi-angle light scattering instrument with a laser source of 659 nm wavelength at room temperature. Refractive index increments were measured using an Atago® pocket refractometer (approximately 1.3306-1.5284). Morphologies of copolymers were examined at room temperature using a Hitachi H7600 TEM at 120 kV. Each specimen was diluted, and deposited on a carbon-film supported copper grid, then dried in air overnight. AFM measurements were performed using an AIST SmartSPM™ 1000 instrument in non-contact mode and Micromasch aluminum cantilevers (125 μm, HQ: NSC14/AI BS-15). The average size of phase separation domain was measured by taking the average size of 20 measurements. Resonance frequency and nominal force stiffness were 164 Hz and 1 N/m respectively. Images were processed using AIST-NT 3.3.95 software. Each specimen was prepared using a SCS 6800 spin coater at 6000 rpm. Each polymer was dissolved in the following solvents: EtOH, DMSO, toluene, DCM, DMF, acetone, THF, and TFT. Solubility test was performed at room temperature. Differential scanning calorimetry (DSC) was performed on a TA Instruments Q2000 DSC. Temperature was ramped from room temperature to −100° C., then to 150° C. at 10° C./min. Two ramping cycles were performed on each specimen of a size 5-10 mg. Dynamic mechanical analysis (DMA) was performed on a TA Instruments Q800 DMA in strain control mode. Rectangular film samples with dimensions between 4-6 mm wide, 0.1-0.5 mm thick, and using 9.95-9.97 mm gauge length at room temperature were tested using 10 μm amplitude, force track 125%, at 10 Hz, at 2° C. min$^{-1}$ as standard experimental conditions. Dynamic moduli, mechanical dampening, and length were analyzed using TA Universal Analysis 2000. A JEOL ECX-300 spectrometer was used to record $^1$H NMR spectra at 300 MHz at room temperature. Acetone-d6 was used as solvent for each sample. Micro-attenuated total reflectance Fourier transform infrared spectra (micro-ATR FTIR) were obtained using an Agilent Cary 680 FTIR single-beam spectrometer setting at 4 cm$^{-1}$ resolution. A diamond crystal; and constant contact pressure between crystal and the specimens was used.

Table 1, below, summarizes molecular weight ($M_w$), dispersity (Đ), glass transition temperatures ($T_g$), decomposition temperature ($T_d$) and α-methyl proton chemical shifts. As seen, $M_w$ ranged from $0.5 \times 10^6$ g/mol to $4.0 \times 10^6$ g/mol, each block copolymer exhibited two glass transitions ($T_g$), and the Đ values for Am-b-Bn indicated relatively narrow molecular weight values. $^1$H NMR analysis further substantiated that the α-methyl proton chemical shifts clearly show distinct features from corresponding homopolymers and statistical copolymers. $^1$H spectra of each homopolymer, statistical copolymer and corresponding block copolymer was obtained. In α-methyl protons chemical resonance range of the block copolymers, there were resonances at 1.28, 1.05 and 0.87 ppm, which correspond to pMMA α-methyl protons chemical shifts, indicating the presence of pMMA segments. There were also α-methyl protons chemical resonances exhibiting deshielding effect from fluorinated units, causing shifts to downfield. However, the deshielding effect appeared to be less than that of pM$_F$, which indicated that these deshielded resonances of the block copolymers corresponded to randomized blocks. Therefore, the resulting block copolymers consisted of pMMA blocks and interfaces of pMMA-st-M$_F$ blocks. This was also evidenced by the shift of T$_g$ of the block copolymers compared to the T$_g$ of corresponding homopolymers.

TABLE 1

| | Copolymer Structure | Molecular Weight* ±0.11 × 10$^6$ g/mol | Dispersity** | Glass Transition T$_g$*** ±1° C. | Decomposition**** ±1° C. | α-methyl proton $^1$H NMR shift (ppm) |
|---|---|---|---|---|---|---|
| A pMMA-b-PFPMA | | 0.99 | 0.29 | 45, 83 | 285 | 0.93, 0.97, 0.99, 1.01, 1.10, 1.13, 1.16, 1.30 |
| B pMMA-b-HFBA | | 1.46 | 0.19 | 3, 20 | 371 | 0.88, 0.96, 1.02, 1.06, 1.13, 1.21, 1.29, |
| C pMMA-b-HFBMA | | 0.43 | 0.34 | 51, 100 | 273 | 0.86, 0.90, 0.93, 1.04, 1.07, 1.24–1.29 |
| D pMMA-b-HFIPA | | 1.46 | 0.37 | 42, 89 | 357 | 0.86, 0.97, 1.04, 1.11, 1.18, 1.21, 1.25, 1.29 |
| E pMMA-b-HFIPMA | | 3.91 | 0.46 | 95, 108 | 293 | 0.86, 0.93, 1.04, 1.09, 1.17, 1.26 |
| pMMA-st-PFPMA | Statistical | 0.43 | >0.5 | 89 | 274 | 0.89, 0.93, 1.04, |
| pMMA-st-HFBA | Statistical | 0.36 | >0.5 | 40 | 338 | 0.87, 0.95, 0.99, |
| pMMA-st-HFBMA | Statistical | 0.24 | >0.5 | 84 | 274 | 0.89, 0.94, 1.02, |
| pMMA-st-HFIPA | Statistical | 0.36 | >0.5 | 67 | 320 | 0.88, 0.96, 1.07, |
| pMMA-st-HFIPMA | Statistical | 0.54 | >0.5 | 81 | 313 | 0.88, 0.93, 1.08 |
| pMMA | Homopolymer | 0.69 | >0.5 | 127 | 283 | 0.87, 1.05, 1.27 |
| pPFPMA | Homopolymer | 0.51 | >0.5 | 64 | 356 | 0.99, 1.01, 1.16, |

TABLE 1-continued

|  | Copolymer Structure | Molecular Weight* ±0.11 × 10⁶ g/mol | Dispersity ** | Glass Transition $T_g$*** ±1° C. | Decomposition**** ±1° C. | α-methyl proton ¹H NMR shift (ppm) |
|---|---|---|---|---|---|---|
| pHFBA | Homopolymer | 0.40 | >0.5 | −17 | 370 | N/A |
| pHFBMA | Homopolymer | 0.06 | >0.5 | 60 | 266 | 1.01, 1.17, 1.30 |
| pHFIPA | Homopolymer | 0.06 | >0.5 | 21 | 350 | N/A |
| pHFIPMA | Homopolymer | 2.38 | >0.5 | 57 | 329 | 1.16, 1.25, 1.40, |

*Determined from static light scattering (SLS).
**Determined from dynamic light scattering (DLS).
***Determined from differential scanning calorimetry (DSC) and dynamic mechanical analysis (DMA).
****Determined from thermogravimetric analysis (TGA).

Figure 7:
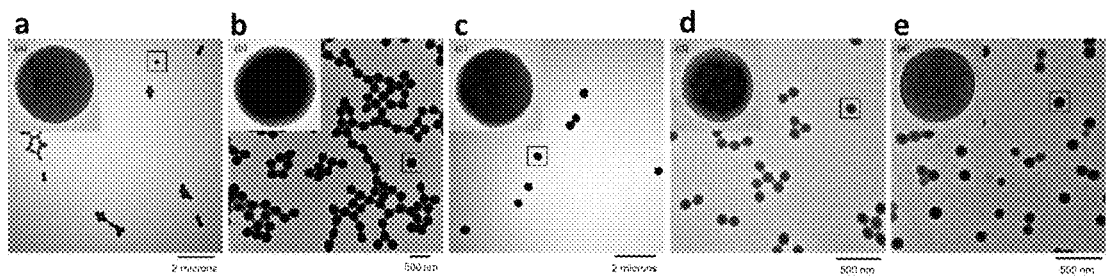
FIG. 7 provides TEM images of fluorinated core-shell nanoparticle copolymers obtained via the one-step formation process.

FIG. 7 illustrates TEM images of the block copolymers including pMMA-b-PFPMA (a), pMMA-b-HFBA (b), pMMA-b-HFBMA (c), pMMA-b-HFIPA (d), and pMMA-b-HFIPMA (e). The presence of core-shell morphologies is an indication of the phase separation in which the hydrophobic fluorine-containing phase forms the core and the hydrophilic pMMA blocks are in the shell. The pMMA block was formed in the aqueous phase and became less hydrophilic as the size of the block increased, thus facilitating space and allowing the hydrophobic monomers to diffuse into the space with the pMMA block then forming the outer shell. The hydrophobic monomer diffusing into pMMA shell was sequentially initiated and copolymerized, thus forming a hydrophobic core as depicted in TEM images.

Figure 8:
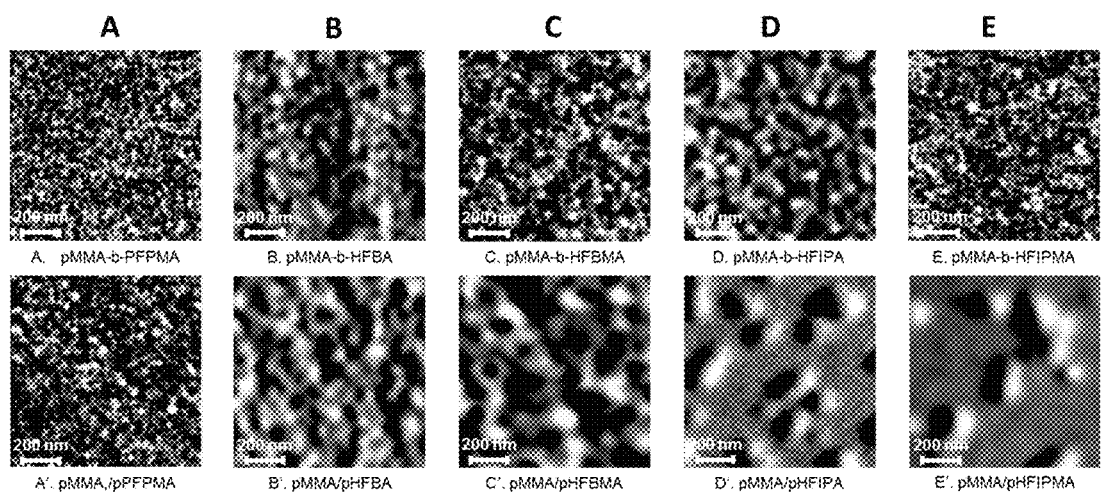
FIG. 8 provides phase images of fluorinated block copolymers after thermal annealing at 140° C. for 24 hr. Image size is 1×1 µm².

AFM phase images are shown in FIG. 8, images in the top row illustrate the nano-scale phase separation of the fluorinated block copolymers included pMMA-b-PFPMA (A), pMMA-b-HFBA (B), pMMA-b-HFBMA (C), pMMA-b-HFIPA (D), and pMMA-b-HFIPMA (E). For comparison, the images in the bottom row are the phase images of the corresponding blends of the homopolymers. The darker areas represent the phase containing mainly pMMA, whereas the brighter areas represent the fluorine-containing phase. As seen, the blends of the respective homopolymers appear to have larger phase-separated domain compared to their phase segregated counter parts obtained via copolymerization as described herein.

The average phase size of the pMMA-b-PFPMA domain was 56 nm, whereas the corresponding pMMA/pPFPMA blend exhibited average phase size of about 75 nm. Block copolymer pMMA-b-HFBA had an average phase size of 74 nm, which is about half of the size of the separated phase (117 nm) in the corresponding blend pMMA/pHFBA. In pMMA-b-HFBMA, the average phase size was about 51 nm, whereas it was 210 nm for the corresponding blend pMMA/pHFBMA. The average phase size was 48 nm in pMMA-b-HFIPA, and it was 326 nm in the corresponding blend pMMA/pHFIPA. The average phase size of pMMA-b-HFIPMA was about 61 nm, whereas it was 265 nm in the corresponding blend pMMA/pHFIPMA.

The solubility properties of the copolymers formed as described and those of solution polymerized copolymers were examined in the following organic solvents: ethanol (EtOH), dimethyl sulfoxide (DMSO), toluene, dichloromethane (DCM), dimethyl formamide (DMF), acetone, tetrahydrofuran (THF) and trifluorotoluene (TFT). Notably, the copolymers formed as disclosed herein exhibited different solubility as compared to corresponding homopolymers and statistical copolymers. All homopolymers as well as statistical and disclosed copolymers were soluble in acetone, THF, and TFT. However, pMMA-b-PFPMA exhibited no solubility in DMF, while both pPFPMA and pMMA-st-PFPMA were soluble. In contrast, statistical pMMA-st-HFBA was soluble in toluene, DCM and DMF, whereas pHFBA was insoluble. The corresponding pMMA-b-HFBA copolymer was soluble in DCM, but insoluble in toluene and DMF. pMMA-st-HFBMA and pHFBMA were insoluble in toluene and DMF, but were soluble in DCM, whereas pMMA-b-HFBMA was soluble in toluene. pMMA-b-HFIP and pMMA-b-HFIPMA were soluble in DMSO, whereas their corresponding statistical copolymers and homopolymers exhibited no solubility in DMSO.

The homopolymers of the fluorine-containing monomers exhibited decreasing solubility as the length of the fluorocarbon side chain increased. Non-fluorinated pMMA was soluble in toluene, DCM, DMF, acetone, THF, and TFT, whereas all the fluorinated homopolymers showed no solubility in toluene. Only pPFPMA and pHFBMA among all five fluorinated homopolymers were soluble in DCM. pHFBMA and pHFBA were not soluble in DMF. This led to the understanding that the fluorinated blocks have lower solubility compared to the pMMA block, thus the presence of fluorine-containing blocks caused lower solubility of the block copolymers.

As the relative solubility of the monomers plays an important role in the synthesis of the copolymers, it is believed that the fluorine-monomers acted as monomers and a water insoluble organic phase, extracting part of hydrophilic MMA away from the aqueous phase. As such, the polymer blocks are believed to have included different MMA-$M_F$ ratios. This was evidenced by the results of thermal analysis and NMR data. The two $T_g$ values of the block copolymers deviated from the $T_g$ of the corresponding homopolymers as listed in Table 1, which indicated that some blocks could be "contaminated" with another monomer. The solution polymerized p(MMA-st-$M_F$) exhibited only one Tg.

The higher the initiator concentration, the higher probability that the initiated pMMA block terminated through combination in aqueous phase, thus more MMA content could be expected in the blocks. Varying the KPS initiator concentration from 0.002 to 0.02 g/mL, the fluorine-monomer content in the final product increased as the KPS initiator concentration decreased.

While certain embodiments of the disclosed subject matter have been described using specific terms, such description is for illustrative purposes only, and it is to be understood that changes and variations may be made without departing from the spirit or scope of the subject matter.

What is claimed is:

1. A method for forming ultrahigh molecular weight amphiphilic block copolymers comprising
combining a hydrophilic monomer and a hydrophobic monomer in an aqueous solvent, the hydrophilic monomer exhibiting greater solubility in the aqueous solvent as compared to the hydrophobic monomer, the hydrophobic monomer aggregating in the aqueous solvent to form dispersed droplets upon addition of the hydrophobic monomer to the aqueous solvent, the concentration of the hydrophilic monomer in the aqueous solvent being greater than the concentration of the hydrophobic monomer in the aqueous solvent; and
adding a polymerization initiator to the aqueous solvent at a rate of about 0.1 milligrams initiator per minute or slower, wherein the initiator is soluble in the aqueous solvent at the reaction conditions, upon which ultrahigh molecular weight amphiphilic block copolymers having a number average molecular weight of about 500,000 or greater forming according to a heterogeneous radical polymerization reaction.

2. The method of claim 1, wherein no surfactants are added to the solvent.

3. The method of claim 1, wherein the ultrahigh molecular weight block copolymers are formed over a period of about 6 hours or less.

4. The method of claim 1, wherein the ultrahigh molecular weight block copolymers are in the form of core/shell nanoparticles.

5. The method of claim 4, wherein the core/shell nanoparticles form inverse polymeric micelles in response to a stimulation.

6. The method of claim 1, wherein the ultrahigh molecular weight block copolymers are in the form of nanowires.

7. The method of claim 1, wherein the aqueous solvent is water.

8. The method of claim 1, wherein the hydrophobic monomer has a solubility in the aqueous solvent of about 20 grams per liter or less.

9. The method of claim 1, wherein the reactivity of the hydrophilic monomer to itself is higher than the reactivity of the hydrophilic monomer to the hydrophobic monomer.

10. The method of claim 1, wherein the hydrophilic monomer comprises a group capable of protonation in the aqueous solvent.

11. The method of claim 10, wherein the group is a tertiary amine group.

12. The method of claim 1, wherein the hydrophilic monomer or the hydrophobic monomer comprises a halogen.

13. The method of claim 12, wherein the hydrophilic monomer or the hydrophobic monomer comprises a fluorine.

14. The method of claim 1, wherein the ratio of the molar concentration of the hydrophilic monomer to that of the hydrophobic monomer upon combination of the two with the solvent is about 2:1 or higher.

15. The method of claim 1, wherein the ultrahigh molecular weight block copolymer is a diblock copolymer.

16. The method of claim 1, wherein the ultrahigh molecular weight block copolymer is a triblock copolymer.

* * * * *